M. THOMPSON-MEARES.
DISH PAN.
APPLICATION FILED NOV. 1, 1909.
973,684.
Patented Oct. 25, 1910.
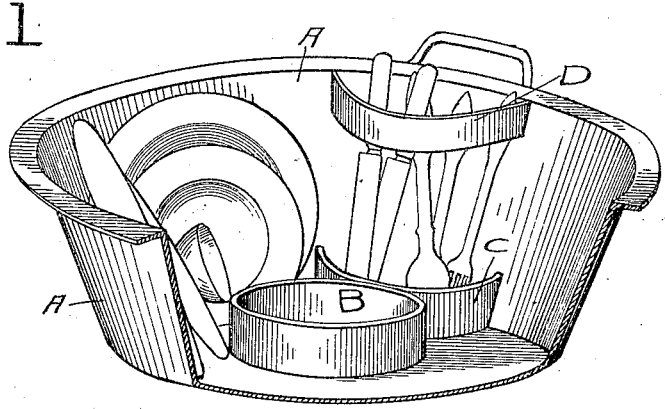
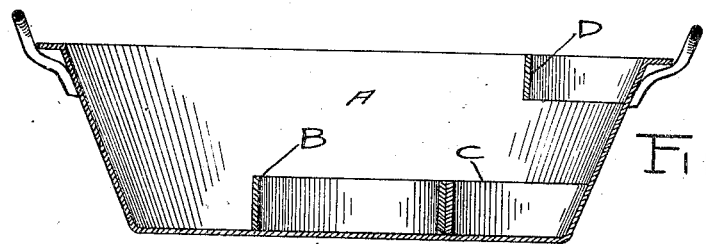
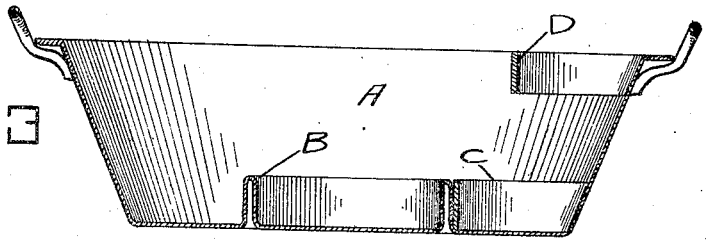
WITNESSES:
N. G. Frost
P. S. Pidwell
INVENTOR
Mary Thompson-Meares.
by Miller & White
ATTORNEYS

UNITED STATES PATENT OFFICE.

MARY THOMPSON-MEARES, OF PALO ALTO, CALIFORNIA, ASSIGNOR OF ONE-HALF TO ANNA D. CONNELLY, OF PALO ALTO, CALIFORNIA.

DISH-PAN.

973,684.   Specification of Letters Patent.   Patented Oct. 25, 1910.

Application filed November 1, 1909. Serial No. 525,712.

*To all whom it may concern:*

Be it known that I, MARY THOMPSON-MEARES, a citizen of the United States, and a resident of Palo Alto, in the county of Santa Clara and State of California, have invented a new and useful Improvement in Dish-Pans, of which the following is a specification.

The invention relates to an improvement in pans or vessels which are adapted to receive and hold water or other cleaning fluid in which dishes and other culinary utensils are immersed and washed.

The object of the invention is to provide a pan or vessel in which dishes, table silverware, and other culinary utensils may be washed and cleaned by a person without the necessity of immersing the hands in the water.

Another object of the invention is to provide a vessel in which dishes and cutlery may be placed and held in such position that a clear space of water is obtained in the center of the pan in which the dishes are singly washed.

A further object of the invention is to provide a pan which can be used for washing dishes and also in the preparation of vegetables prior to cooking.

These objects I accomplish by forming or fitting a standing abutment in the bottom of the pan to act as a support for the dishes and by attaching bands to the side of the pan at the upper edge and at the bottom to form a pocket to retain the cutlery and silverware in an upright position and separate from the dishes. The abutment which I have shown consists of a standing ring concentric with the bottom of the pan, but it is evident that this could be made of different shapes, and I do not wish to limit myself to the construction shown.

In the use of dish pans of the usual form, the dishes and cutlery are laid flat in the pan, and covered with hot water, and to reach them it is necessary to immerse the hands in the water. And when a quantity of dishes are placed in the pan at one time, the upper ones are barely covered with the water, and considerable difficulty is experienced in cleaning them properly. In the device of my invention, the dishes and cutlery are placed upright around the side of the pan, leaving a clear space in the center in which they may be conveniently cleaned.

The following description explains at length the nature of my said improvement, reference being had to the drawings accompanying this specification.

Figure 1 is a view in perspective of the dish pan embodying my improvements, part of the side being broken away to show the position of the various elements and the position that dishes and cutlery will assume when placed in the pan. Fig. 2 is a cross section showing the relative position of the parts. Fig. 3 is a cross-section of a modification in which the standing abutment is formed integral with the bottom of the pan.

In the construction of my invention I use the ordinary dish-pan A which may be of any desirable size and form and made of any suitable sheet metal. The standing element B, which forms an abutment or support for the dishes is preferably made of the same material as the pan and of about the proportion shown in the drawings. This element B acts as a support or brace for the dishes and holds them in an angular position around the side of the pan, leaving the center clear for washing and cleaning purposes. The larger dishes are preferably set at the side of the pan and the smaller dishes in front with the edge resting against the standing element B.

An amount of heated water to be used in cleaning the dishes is poured into the pan, completely covering the standing element B, but allowing a part of each dish to extend above the surface. The dishes can then be grasped by the hand without immersing it in the water, and can be held in the water in the central clear space and cleaned with a dish-mop, having a handle, without putting either hand in the water. One dish is cleaned at a time, and any material washed therefrom settles to the bottom of the pan and does not lodge on the other dishes as is the case at the present time when several dishes are placed flat in the pan at one time.

The standing element or support C secured to the bottom of the pan and the strap or support D secured to the side of the pan above the support C, form a pocket for the reception of the table silver and cutlery, thereby allowing both dishes and cutlery to be cleaned at the same time without danger of cutting the washer's hand. Knives with bone or ivory handles which discolor and deteriorate in hot water can be placed in the pocket with the blade end down and thereby the handles are held out of the water.

The standing element or support B in the bottom may be formed integral with the bottom of the pan as shown in Fig. 3, when the pan is stamped, or may be fitted thereto after the pan is made.

The pan may also be used in the preparation of vegetables, such as potatoes, which are to be pared by allowing the parings to fall into the space between the standing ring B and the side of the pan, and placing the pared potatoes in the central space. Water may be placed in this space whenever it is found desirable and need not be placed in the others.

I do not wish to limit myself to the exact construction shown in the drawings, as it is evident that changes could be made in the construction herein shown and specifically described without varying from the spirit of this invention.

I claim:

An article of manufacture adapted to hold water having at its bottom a ring-like abutment removed from the side walls extending a short distance upwardly and leaving a free space within the pan over its top for the wash water, and having at one side of said abutment a support for cutlery and similar articles comprising top and bottom straps.

MARY THOMPSON-MEARES.

Witnesses:
    MONROE THOMAS,
    GEO. BLAKESLEY LITTLE.